United States Patent
Wilson et al.

(10) Patent No.: US 8,890,817 B2
(45) Date of Patent: Nov. 18, 2014

(54) CENTRALIZED PROCESSING OF TOUCH INFORMATION

(75) Inventors: Thomas James Wilson, Pleasanton, CA (US); Richard James Reeve, Montara, CA (US)

(73) Assignee: Apple Inc., Cupertino, CA (US)

( * ) Notice: Subject to any disclaimer, the term of this patent is extended or adjusted under 35 U.S.C. 154(b) by 595 days.

(21) Appl. No.: 12/877,051

(22) Filed: Sep. 7, 2010

(65) Prior Publication Data

US 2012/0056822 A1 Mar. 8, 2012

(51) Int. Cl.
*G06F 3/041* (2006.01)

(52) U.S. Cl.
USPC .......................................................... 345/173

(58) Field of Classification Search
USPC .......................................................... 345/173
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 7,812,827 B2 * | 10/2010 | Hotelling et al. | 345/173 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kent Chang
*Assistant Examiner* — Nathan Brittingham
(74) *Attorney, Agent, or Firm* — Morrison & Foerster LLP

(57) ABSTRACT

Centralized processing of touch information obtained by multiple touch sensing controllers connected to a touch sensing surface is provided. Each touch controller can obtain touch information of sense signals from different sense lines of the touch sensing surface and can store the touch information in a corresponding memory of the controller. The touch information of one or more of the touch sensing controllers can be transmitted as results data to a processor that processes all of the touch information. In some cases, prior to transfer of the results data, a determination of the validity of a sense channel can be made, and invalid channels can be excluded from the transfer.

20 Claims, 12 Drawing Sheets

(56) References Cited

U.S. PATENT DOCUMENTS

| | | | |
|---|---|---|---|
| 7,848,825 B2* | 12/2010 | Wilson et al. | 700/3 |
| 8,279,180 B2* | 10/2012 | Hotelling et al. | 345/173 |
| 8,479,122 B2 | 7/2013 | Hotelling et al. | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0158175 A1* | 7/2008 | Hotelling et al. | 345/173 |
| 2008/0225010 A1* | 9/2008 | Wang | 345/173 |
| 2008/0238879 A1* | 10/2008 | Jaeger et al. | 345/173 |
| 2009/0303203 A1* | 12/2009 | Yilmaz et al. | 345/174 |
| 2010/0060609 A1* | 3/2010 | Doi et al. | 345/174 |
| 2011/0063993 A1* | 3/2011 | Wilson et al. | 370/254 |
| 2011/0134076 A1* | 6/2011 | Kida et al. | 345/174 |
| 2011/0175823 A1* | 7/2011 | Vieta | 345/173 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

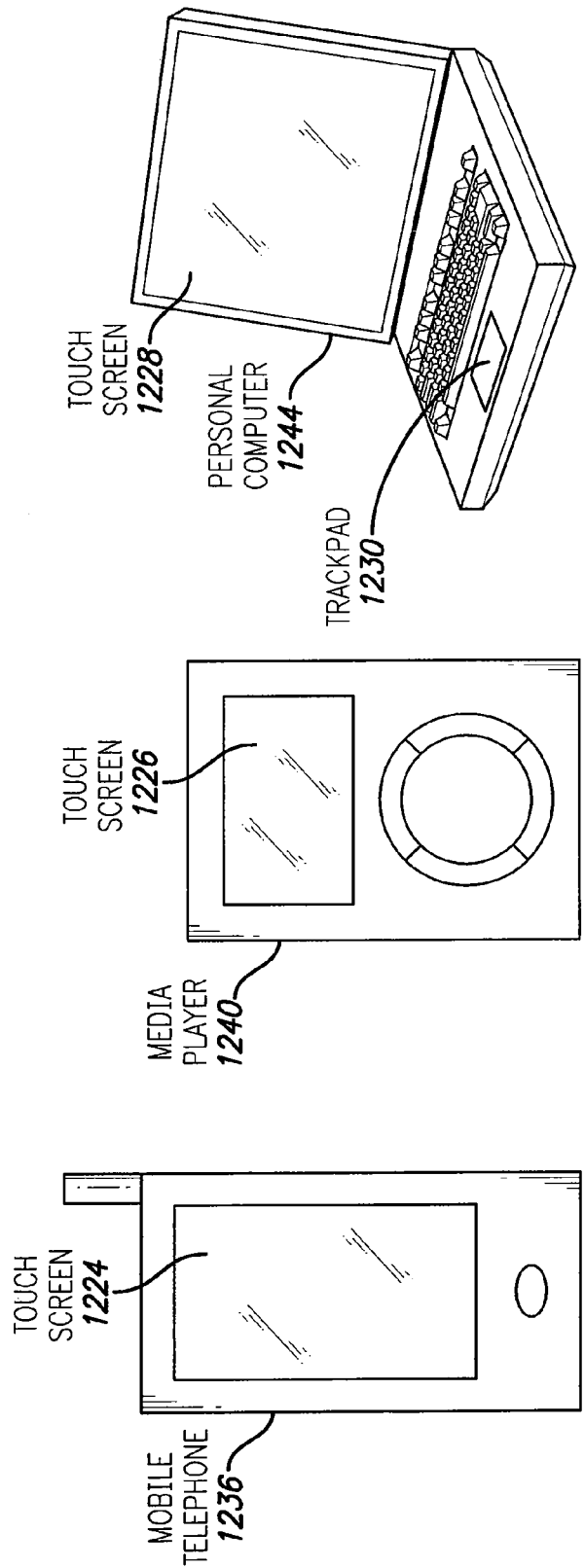

CENTRALIZED PROCESSING OF TOUCH INFORMATION

FIELD OF THE DISCLOSURE

This relates generally to processing of touch information obtained by multiple touch sensing controllers, and more particularly, to centralized processing of touch information.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a transparent touch sensor panel positioned in front of a display device such as a liquid crystal display (LCD), or an integrated touch screen in which touch sensing circuitry is partially or fully integrated into a display, etc. Touch screens can allow a user to perform various functions by touching the touch screen using a finger, stylus or other object at a location that may be dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels, for example, can be formed from a matrix of drive and sense lines of a substantially transparent conductive material such as Indium Tin Oxide (ITO), often arranged in rows and columns in horizontal and vertical directions on a substantially transparent substrate. Drive signals can be transmitted through the drive lines, which can make it possible to measure the static mutual capacitance at the crossover points or adjacent areas (sensing pixels) of the drive lines and the sense lines. The static mutual capacitance, and any changes to the static mutual capacitance due to a touch event, can be determined from sense signals that can be generated in the sense lines due to the drive signals.

Controllers can be used to generate the drive signals for the touch sensor panel, and can also be used to receive and process sense signals from the touch sensor panel. Controllers can be implemented in an Application Specific Integrated Circuit (ASIC). However, because a particular controller ASIC design can provide only a limited number of drive signals and can receive only a limited number of sense signals, as the number of drive and sense lines on larger or finer resolution touch sensor panels increases, that single controller ASIC can be inadequate to support those touch sensor panels.

SUMMARY OF THE DISCLOSURE

This relates to processing of touch information obtained by multiple touch sensing controllers, and more particularly, to centralized processing of touch information. The centralized processing can include obtaining touch information in multiple, separate touch sensing controllers that are connected to a touch sensing surface. For example, each touch sensing controller can receive sense signals from different sense lines of a touch sensing surface. Each touch sensing controller can store touch information of the sense signals in a corresponding memory of the controller. The touch information of one or more of the touch sensing controllers can be transmitted as results data to a processor that processes all of the touch information. In some embodiments, prior to transfer of the results data, a determination of the validity of a channel can be made, and invalid channels can be excluded from the transfer.

BRIEF DESCRIPTION OF THE DRAWINGS

FIGS. 12A-12C illustrate an example mobile telephone, an example digital media player, and an example personal computer that each include an example master/slave touch controller configuration according to various embodiments.

DETAILED DESCRIPTION

Figure 1:
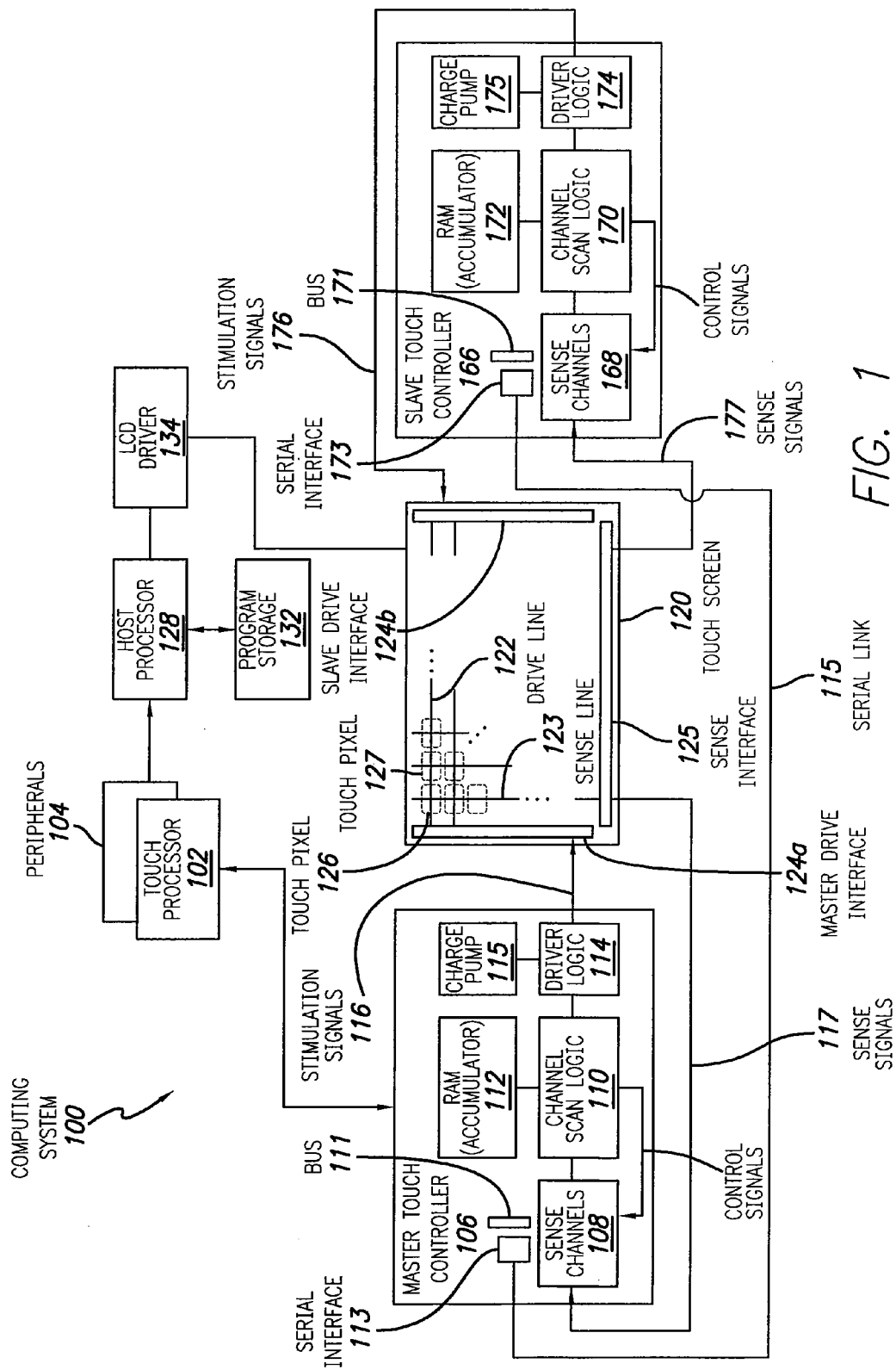
FIG. 1 illustrates an example touch sensing system according to various embodiments.

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

This relates generally to processing of touch information obtained by multiple touch sensing controllers, and more particularly, to centralized processing of touch information. The centralized processing can include obtaining touch information in multiple, separate touch sensing controllers that are connected to a touch sensing surface, and transmitting the touch information of one or more of the touch sensing controllers to a processor that processes all of the touch information. Prior to transfer of the results data, a determination of the validity of a channel can be made, and invalid channels can be excluded from the transfer.

Although embodiments disclosed herein may be described and illustrated herein in terms of mutual capacitance touch sensing surfaces, it should be understood that the embodiments are not so limited, but can be additionally applicable to, for example, self-capacitance, optical, resistive, and other touch sensing surfaces and technologies that can detect single and/or multiple touches on or near the surface. Furthermore, although embodiments may be described and illustrated herein in terms of a single master/single slave system, it should be understood that some embodiments can include systems using a single master and multiple slaves, multiple masters and multiple slaves, and other configurations.

In some example embodiments, a touch sensing surface can include a touch screen, such as an LCD display with touch sensing functionality that is inactive during a display phase when display circuitry is generating an image, and that senses touch during a touch sensing phase when the display circuitry is inactive, such as during a blanking period of the display. Sensing touch when other circuitry of the device, such as display circuitry, is inactive can help mitigate the effects of noise and/or interference caused by the other circuitry on touch sensing, but can also reduce the amount of time allowed for each touch sensing processing.

By way of example, some embodiments of an integrated touch sensing system may be based on self capacitance and some embodiments may be based on mutual capacitance. In a self capacitance based touch system, each of the touch pixels can be formed by an individual electrode that forms a self-capacitance to ground. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by the touch sensing system to determine the positions of multiple objects when they touch the touch screen. In a mutual capacitance based touch system, the touch sensing system can include, for example, drive regions and sense regions, such as drive lines and sense lines. In one example case, drive lines can be formed in rows while sense lines can be formed in columns (e.g., orthogonal). The touch pixels can be provided at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, an integrated touch screen can be multi-touch, single touch, projection scan, full-imaging multi-touch, or any capacitive touch.

Controlling touch sensing using a master/slave system can provide advantages. For example, in some integrated circuit (IC) implementations of touch controllers, a master/slave configuration may result in a reduction of the number of connections needed for the DIE, which could allow the use of less expensive and/or smaller DIE packaging options, such as allowing the use of wafer chip scale packaging instead of ball grid array packaging. Consequently, the cost, size and/or thickness of the device may be reduced.

In some cases, designing a touch sensing system using two or more touch controllers in a master/slave configuration may be less expensive than using a single touch controller. For example, larger and/or higher resolution touch sensing surfaces, such as touch pads and touch screens, may be designed to include more drive lines and/or sense lines than existing touch controllers can process in a single scan. In some cases, it may be possible to control touch sensing of a new touch sensing surface using a single existing touch controller by scanning some of the drive/sense lines during a first scan and then scanning the remaining drive/sense lines during a second scan, e.g., dual scan. However, some applications may require touch data to be processed in less time than a dual scan of the panel would require. In this case, one option could be to design a new touch controller that includes more drive channels and sense channels to handle the larger touch sensing surface. However, designing a new touch controller can be expensive. In some cases, a significant cost savings may be realized by using two or more existing touch controllers in a master/slave configuration to control the new touch sensing surface, instead of designing a new touch controller.

However, implementing a master/slave configuration in some touch sensing systems can be difficult. For example, timing constraints in some touch sensing systems can pose barriers to implementing a master/slave configuration of touch controllers. In some touch sensing systems, synchronization of various signals, events, etc., can be important for the accurate operation of touch sensing.

For example, some touch sensing systems can stimulate multiple drive channels with multiple, simultaneous drive signals to generate one or more sense signals. Each sense signal can include a superposition of signals resulting from the multiple drive signals. Touch information can be extracted from one or more of the sense signals through a variety of methods. For example, in some mutual capacitance touch sensing systems, sense signals are generated from injections of charge at multiple locations on a sense line. The injections of charge correspond to drive signals that are simultaneously applied to multiple drive lines. The sense signals can be demodulated, and the extracted data can be integrated over a number of scan steps to obtain touch data. Accurate demodulation can require a high degree of synchronization of, for example, the phases of the stimulation signals, the phases of the demodulation signals, the timing of various processing operations, etc.

FIG. 1 is a block diagram of an example computing system 100 that illustrates one implementation of an example touch screen 120 according to embodiments of the disclosure. Computing system 100 could be included in, for example, a mobile telephone, a digital media player, a personal computer, or other devices that include a touch screen. Computing system 100 can include a touch sensing system including one or more touch processors 102, peripherals 104, a master touch controller 106, a slave touch controller 166, and touch sensing circuitry (described in more detail below). Peripherals 104 can include, but are not limited to, random access memory (RAM) or other types of memory or storage, watchdog timers and the like. Master touch controller 106 can include, but is not limited to, one or more sense channels 108, channel scan logic 110, a bus 111 (such as an advanced high-performance bus (AHB)), a serial interface 113, and driver logic 114. Channel scan logic 110 can control driver logic 114 to generate stimulation signals 116 at various frequencies and phases that can be selectively applied to drive lines 122 of touch screen 120 that are connected to master touch controller 106, as described in more detail below. Sense channels 108 can receive sense signals 117 from sense lines 123 of touch screen 120 that are connected to master touch controller 106. Channel scan logic 110 can access RAM 112 to write and read data. For example, after the sense signals have been processed (described in more detail below), channel scan logic 110 can autonomously read the resulting data from sense channels 108 and accumulate the resulting data by writing the data into RAM 112. Thus, RAM 112 can function as an accumulator of the results data. Channel scan logic 110 can also provide control for sense channels 108.

Slave touch controller 166 can include the same elements as the master touch controller, such as one or more sense channels 168, channel scan logic 170, a bus 171 (such as an AHB), a serial interface 173, and driver logic 174. Channel scan logic 170 can control driver logic 174 to generate stimulation signals 176 at various frequencies and phases that can be selectively applied to drive lines 122 of touch screen 120 that are connected to slave touch controller 166, as described in more detail below. Sense channels 168 can receive sense signals 177 from sense lines 123 of touch screen 120 that are connected to slave touch controller 166. Channel scan logic 170 can access RAM 172 to write and read data. After the sense signals have been processed, channel scan logic 170 can autonomously read the resulting data from sense channels 168 and accumulate the resulting data by writing the data into RAM 172, such that RAM 172 can act as an accumulator of the results data. Channel scan logic 170 can also provide control for sense channels 168.

In some embodiments, the functionality of a touch processor and peripherals may be included in the master touch controller, in both the master touch controller and one or more slave touch controllers, etc., such that touch processor 102 and peripherals 104 may not be required as separate components. In some embodiments, each of the master and slave touch controllers can be implemented as a single application specific integrated circuit (ASIC). In some embodiments, the master and slave touch controllers can have identical designs, i.e., two instances of the same touch controller, with one configured to operate as master and the other configured to operate as slave; in this case, for example, the generation of clock signals and other operations that the slave is capable of performing independently can be disabled so that the slave can rely on the master's clock signals, etc. to allow more synchronous operation. For example, a slave can be configured to receive a clock signal from the master instead of generating the clock signal itself. Likewise, the master can be configured to transmit the clock signal it generates to the slave. Some embodiments can include one or more master touch controllers and/or one or more slave touch controllers.

Computing system 100 can include a serial link 115 that connects master touch controller 106 and slave touch controller 166 through serial interface 113 and serial interface 173, respectively. Serial link 115 can include two wires, for example, one wire for a clock signal and one wire for data. Various elements of master touch controller 106 can communicate with elements of slave touch controller 166 through serial link 115, as described in more detail below. Computing system 100 can also include a host processor 128 for receiving outputs from touch processor 102 and performing actions based on the outputs. For example, host processor 128 can be connected to program storage 132 and a display controller, such as an LCD driver 134. Host processor 128 can use LCD driver 134 to generate an image on touch screen 120, such as an image of a user interface (UI), and can use touch processor 102, master touch controller 106, and slave touch controller 166 to detect a touch on or near touch screen 120, such as a touch input over the displayed UI. The touch input can be used by computer programs stored in program storage 132 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to touch processing.

Touch screen 120 can include touch sensing circuitry that can include a capacitive sensing medium having a plurality of drive lines 122 and a plurality of sense lines 123. It should be noted that the term "lines" is a sometimes used herein to mean simply conductive pathways, as one skilled in the art will readily understand, and is not limited to structures that are strictly linear, but includes pathways that change direction, and includes pathways of different size, shape, materials, etc. One set of drive lines 122 can be driven by master touch controller 106 with stimulation signals 116 from driver logic 114 through a master drive interface 124a, and another set of drive lines 122 can be driven by slave touch controller 166 with stimulation signals 176 from driver logic 174 through a slave drive interface 124b. Resulting sense signals 117 generated in one set of sense lines 123 can be transmitted through a sense interface 125 to sense channels 108 (also referred to as an event detection and demodulation circuit) in master touch controller 106, and resulting sense signals 117 generated in another set of sense lines 123 can be transmitted through sense interface 125 to sense channels 168 in slave touch controller 166. In this way, drive lines and sense lines can interact to form capacitive sensing nodes, which can be thought of as touch picture elements (touch pixels), such as touch pixels 126 and 127. This way of understanding can be particularly useful when touch screen 120 is viewed as capturing an "image" of touch. In other words, touch data extracted from sense signals 117 and 171 can be used to determine whether a touch has been detected at each touch pixel in the touch screen, and the pattern of touch pixels in the touch screen at which a touch occurred can be thought of as an "image" of touch (e.g. a pattern of fingers touching the touch screen). The specific combination of drive and sense lines controlled by the master and slave touch controllers can depend on factors such as the number of drive lines the master and slave are capable of driving, the number of sense lines the master and slave are capable of processing, etc.

Figure 2:
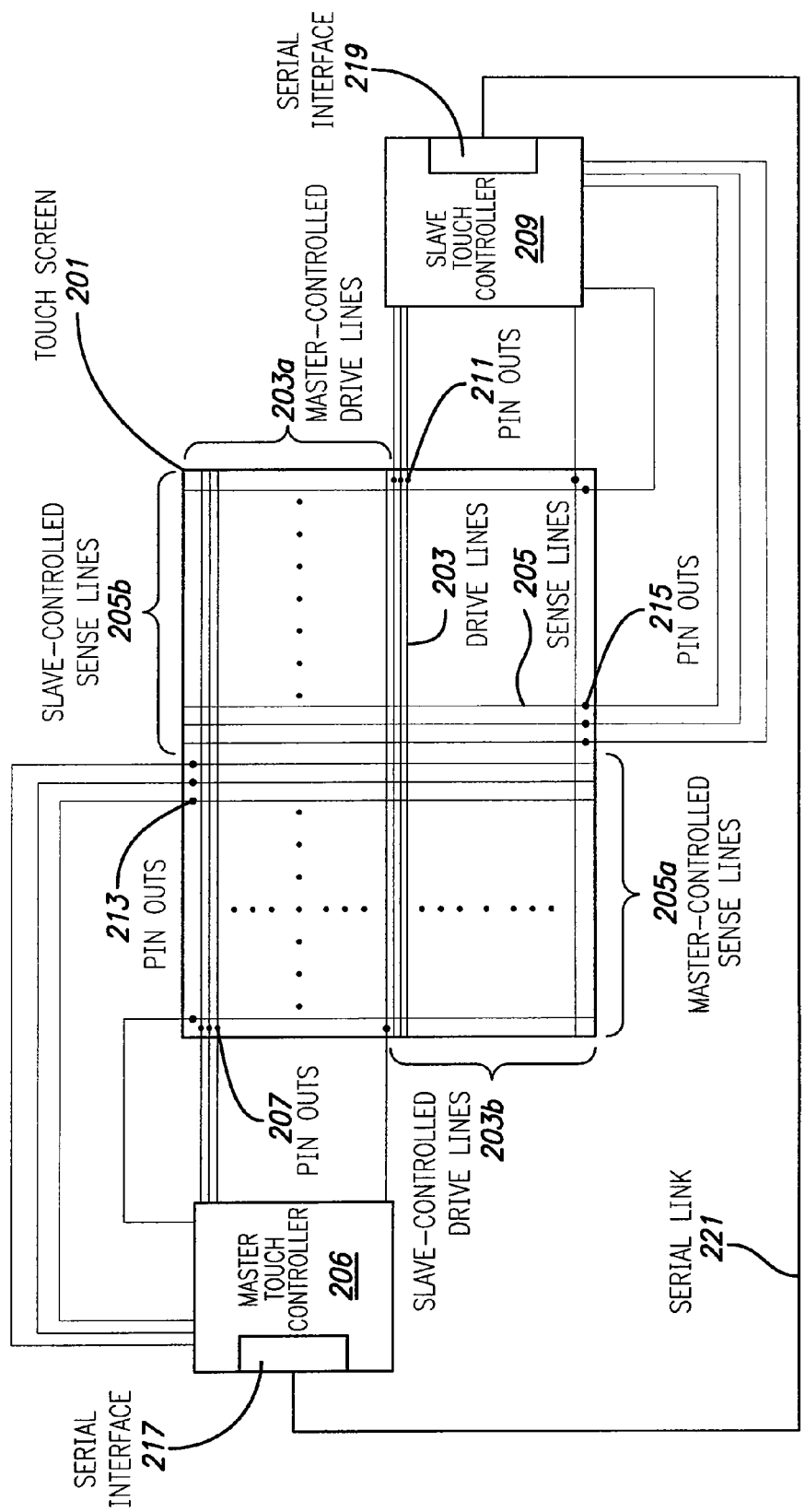
FIG. 2 illustrates another example touch sensing system according to various embodiments.

FIG. 2 illustrates one example combination of drive lines and sense lines controlled by an example master/slave system of touch controllers according to embodiments of the disclosure. FIG. 2 shows a touch screen 201 including drive lines 203 and sense lines 205. In this example embodiment, there are forty drive lines 203 and thirty sense lines 205. A set of twenty of drive lines 203, shown in FIG. 2 as master-controlled drive lines 203a, are connected to a master touch controller 206 through pinouts 207, and a set of the twenty drive lines 203 (shown as slave-controlled drive lines 203b) are connected to a slave touch controller 209 through pinouts 211. A set of fifteen sense lines 205, shown in FIG. 2 as master-controlled sense lines 205a, are connected to master touch controller 206, and a set of fifteen sense lines 205, shown as slave-controlled sense lines 205b, are connected to slave touch controller 209. In this example, pinouts 207 and pinouts 211 serve as a drive interface for the master and slave, such as drive interfaces 124a and 124b in FIG. 1, and pinouts 213 and pinouts 215 serve as sense interfaces for the master and slave, such as sense interface 125 in FIG. 1. The master and slave touch controllers can include serial interfaces 217 and 219, respectively, that allow the master and slave to communicate over a serial link 221, such as serial interfaces 113 and 173 and serial link 115 of FIG. 1.

Figure 3:
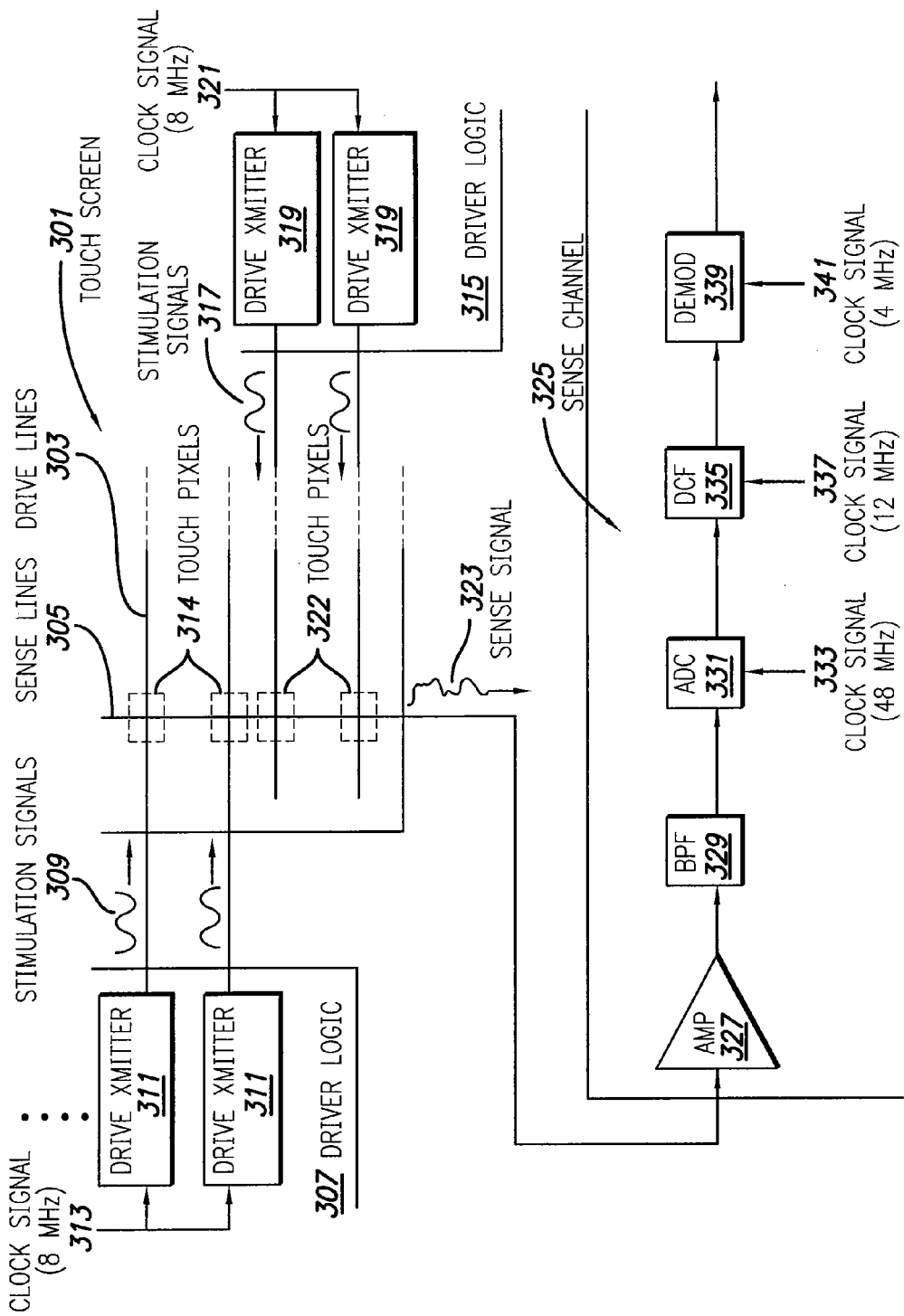
FIG. 3 illustrates an example touch sensing process according to various embodiments.

FIG. 3 illustrates an example touch sensing operation according to embodiments of the disclosure. A touch screen 301 can include drive lines 303 and sense lines 305. Driver logic 307 of a master touch controller can drive some of drive lines 303 with stimulation signals 309 transmitted by drive transmitters 311 based on an 8 MHz clock signal 313, for example. Each stimulation signal 309 can interact with sense line 305. The interaction can vary based on an amount of touch at a corresponding touch pixel 314 and result in a signal on the sense line that can include information of the amount of touch. Driver logic 315 of a slave touch controller can drive other drive lines 303 with stimulation signals 317 transmitted by drive transmitters 319 based on an 8 MHz clock signal 321, for example. Each stimulation signal 317 can interact with sense line 305, and the interaction can vary based on an amount of touch at a corresponding touch pixel 322, resulting in a signal on the sense line that can include information of the amount of touch. Stimulation signals 309 and 317 can be transmitted simultaneously such that the stimulation signals from the master and slave touch controllers interact with sense line 305 at the same time, resulting in a sense signal 323 that can be a superposition of signals resulting from the interaction of each stimulation signal with the sense line. In other words, sense signal 323 can include touch information that can include composite information of the amounts of touch at multiple touch pixels 314 and 322. Sense signal 323 can be received by a sense channel 325 of the master (or slave) touch controller.

An amplifier 327 of sense channel 323 can amplify sense signal 323, and a band pass filter (BPF) 329 can filter the amplified signal. The filtered signal can be converted to a digital signal by an analog-to-digital converter (ADC) 331. For example, ADC 331 can be a sigma-delta ADC, which can operate to oversample the signal at a high-speed to cut down on the amount of noise by sampling at a higher rate than the stimulation signal frequency. In this example, ADC 331 samples the signal at a rate of 48 MHz based on a clock signal 333. ADC 331 can output a digital signal that is 4 bits at the 48 MHz sample rate, for example. The digital signal can be filtered with a decimation filter (DCF) 335 based on a 12 MHz clock signal 337, resulting in a digital signal that is 11 bits at a 4 MHz sample rate, for example. The signal can then be demodulated by a demodulator 339 based on a 4 MHz clock signal 341 to extract the touch information. In some embodiments, the touch information from the demodulated signal can be integrated over multiple scans of touch screen 301, for example, by accumulating the touch information over a period of time in storage devices, such as an accumulator in RAM 112 (or RAM 172 if sense channel 325 is in the slave touch controller) shown in FIG. 1. In some embodiments, the touch information may need to be combined with other touch information in order to extract information of the amount of touch at each individual touch pixel. For example, the touch information may be combined with touch information of other sense lines and/or other scans using processing methods such as eigenvalue analysis including singular value decomposition (SVD) to determine eigenvalues that correspond to information of the amount of touch at individual touch pixels. In some embodiments, the processing methods can include matrix operations, for example.

As illustrated in FIG. 3, the processing of sense signal 323 in sense channel 325 of the master touch controller can be based on three clock signals of the master, i.e., clock signal 333 (48 MHz), clock signal 337 (12 MHz), and clock signal 341 (4 MHz), for example. In some embodiments, the accuracy of the touch information extracted from sense signal 323 by the processing of sense channel 325, for example, can require that the stimulation signals that generate sense signal 323 are in-phase with clock signals 333, 337, and/or 341, i.e., the 48 MHz, 12 MHz, and/or 4 MHz clock signals of the master. For example, demodulating with a demodulation signal that is not in-phase with the stimulation signal can result in an error that manifests as a direct current (DC) offset. In some touch sensing systems, touch information can be a measure of a DC portion of the demodulated signal, and thus, a DC offset error could result in an error in the touch measurement. In some embodiments, the error may be compounded due to, for example, combination of touch information through integration, demodulation, etc., processes. Therefore, the phase alignment of various clock signals can be a consideration in some embodiments.

Figure 4:
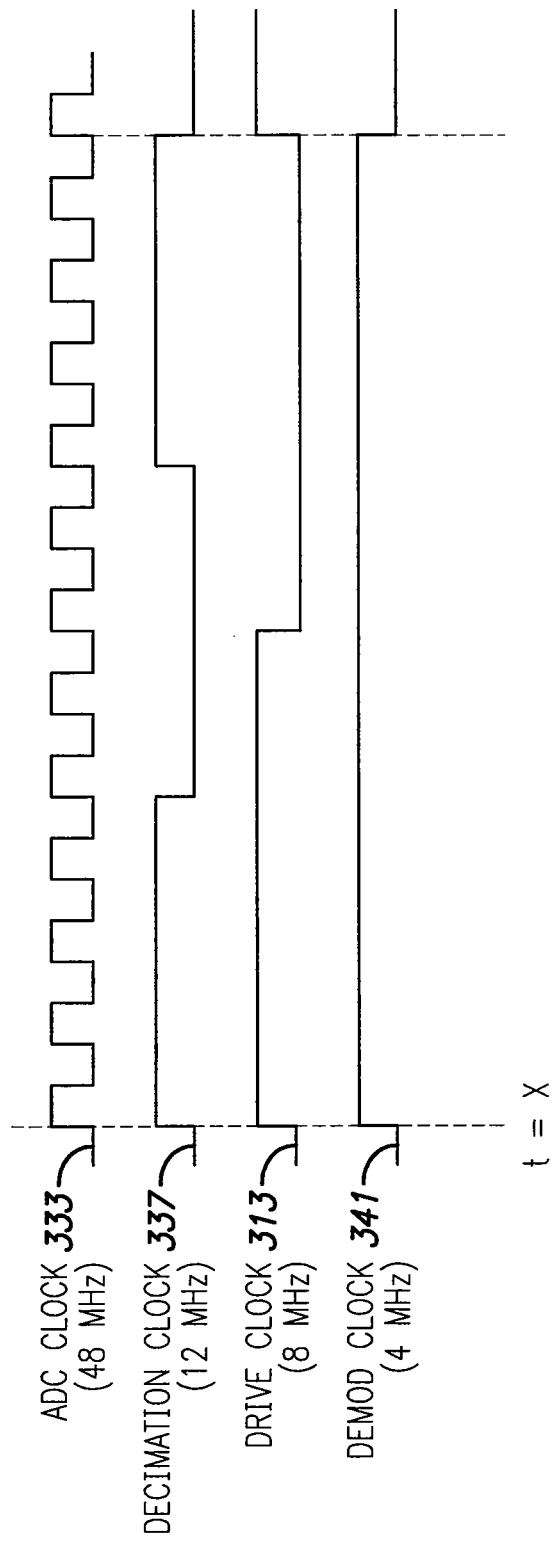
FIG. 4 illustrates example clock signals used in touch sensing according to various embodiments.

FIG. 4 illustrates example square wave clock signals for 48 MHz clock signal 333, 12 MHz clock signal 337, 8 MHz clock signal 313, and 4 MHz clock signal 341 of the master touch controller according to example embodiments of the disclosure. FIG. 4 shows that at a time t=X, each of clock signals 333, 337, 313, and 341 goes from a low state to a high state. Thus, in this example, the clock signals are in-phase at time X. Furthermore, because the higher-frequency clock signals, i.e., clock signals 333, 337, and 313, each have a frequency that is an integer multiple of the frequency of the lowest-frequency clock signal, i.e., clock signal 341, one skilled in the art will understand that the four clock signals will be in-phase every time clock signal 341 goes from the low state to the high state. In other words, every time clock signal 341 goes from the low state to the high state, each of the other three clock signals will also go from the low state to the high state. The master touch controller can generate clock signals 333, 337, 313, and 341 internally such that they are in-phase at time X, as shown in FIG. 4. Thus, the portion of sense signal 323 that results from the master's stimulation signals 309 can be in-phase with clock signals 333, 337, and 341, which are used for processing by ADC 331, DCF 335, and demodulation 339, respectively, of the master's sense channel 325.

However, as described above, sense signal 323 can be a superposition of signals based on the master's stimulation signals 309 and the slave's stimulation signals 317. In other words, sense signal 323 received by the master's sense channel 325 can be based, in part, on a clock signal of the slave touch controller, i.e., clock signal 321 (8 MHz), on which stimulation signals 317 are based. Therefore, it can be desirable that clock signal 321 of the slave touch controller is in-phase with clock signals 333, 337, and 341 of the master touch controller so that, for example, the portion of sense signal 323 resulting from the slave's stimulation signals 317 can be at an appropriate phase for processing in the master's sense channel 325.

Likewise, other sense signals may be received by sense channels of the slave touch controller, and processing of those sense signals may be based on three corresponding clock signals (i.e., a 48 MHz clock signal, a 12 MHz clock signal, and a 4 MHz clock signal, not shown) of the slave. Accurate determination of touch information by the sense channels of the slave touch controller may depend on the phase alignment of 8 MHz clock signal 313 of the master and clock signals in the slave, i.e., the 48 MHz, 12 MHz, and 4 MHz clock signals of the slave. In sum, in this example use of master and slave controllers to process sense signals that can include a superpositions of signals based on each other's drive signals, the accuracy of the touch information extracted from the processing of the sense channels can depend on the phase-alignment of all of the relevant clocks, e.g., the 48 MHz, 12 MHz, 8 MHz clock, and 4 MHz clock signals of the master and slave.

An example method of synchronizing master and slave touch controllers by generating in-phase clock signals of the master and slave touch controllers via a communication link, such as a serial link, according to embodiments of the disclosure will now be described with reference to FIGS. 5-7. In this example method, one of a plurality of clock signals (e.g., the 48 MHz clock signal) can be transmitted between a master controller and a slave controller, and the remaining clock signals (e.g., the 12 MHz, 8 MHz, and 4 MHz clock signals) can be generated in-phase based on the transmitted clock signal. It is noted that example touch sensing operations described above, including transmitting stimulation signals, receiving sense signals, and processing the sense signals to obtain touch information, have been described first for the purpose of illuminating that phase alignment of various clock signals may be advantageous in some master/slave touch sensing configurations. However, in most embodiments, touch sensing operations such as described above will be performed after phase alignment of the master and slave clock signals using, for example, one or more of the example processes described below with reference to FIGS. 5-7.

Figure 5:
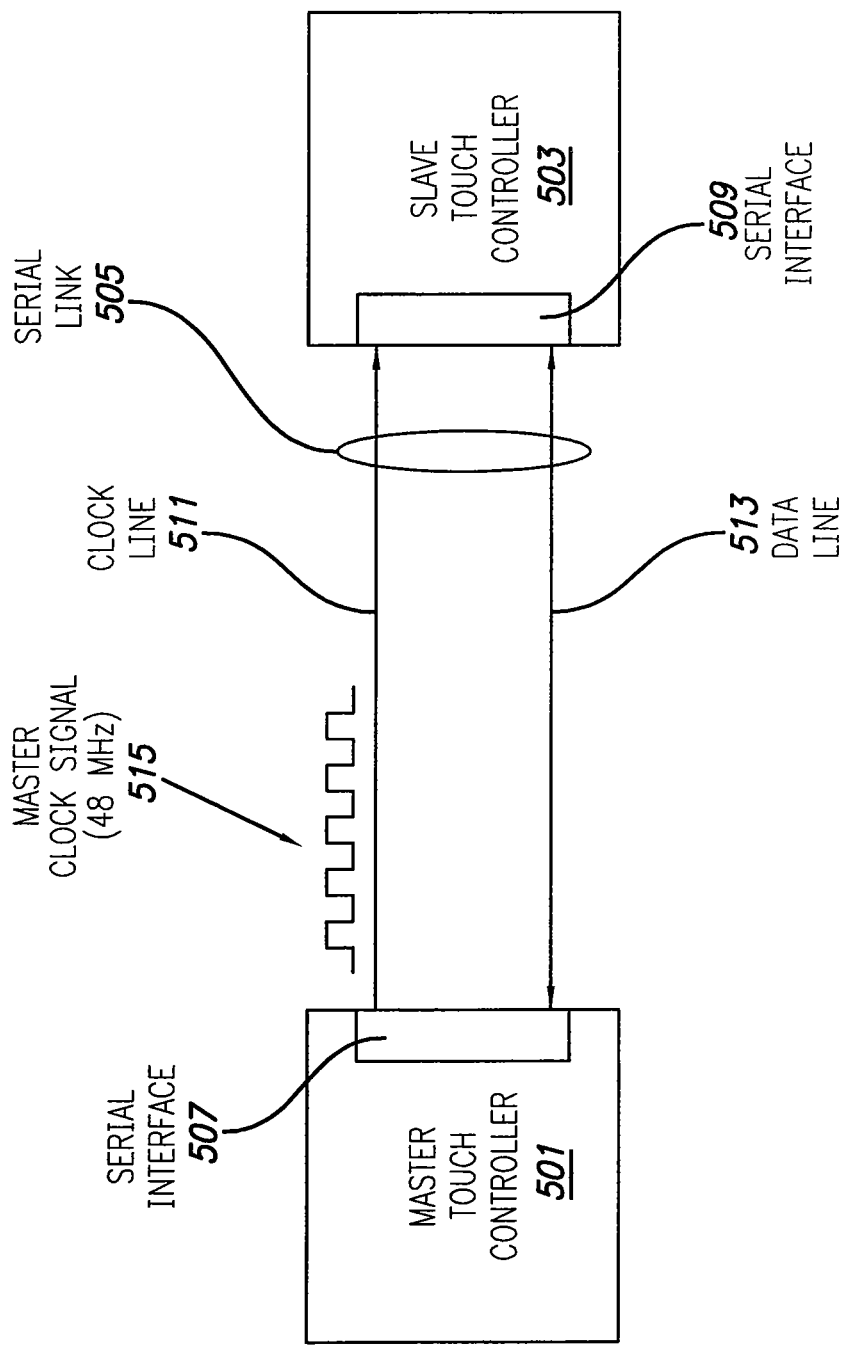
FIG. 5 illustrates an example serial link between a master and slave touch controllers according to various embodiments.

FIG. 5 illustrates an example master/slave touch controller system according to embodiments of the disclosure. A master touch controller 501 can be connected to a slave touch controller 503 with a serial link 505. A master serial interface 507 of master touch controller 501 and a slave serial interface 509 of slave touch controller 503 can perform operations such as establishing a common clock signal, establishing serial communication between the master and slave touch controllers, synchronizing one or more lower-frequency clock signals, programming the slave touch controller, and transmitting results data to a processor for centralized processing, such as transmitting results data from the slave touch controller to a processor located in the master touch controller. In this example, serial link 505 includes a clock line 511 and a data line 513. The master and slave touch controllers can send data, such as commands, control characters, results of touch processing, etc., over data line 513.

Figure 6:
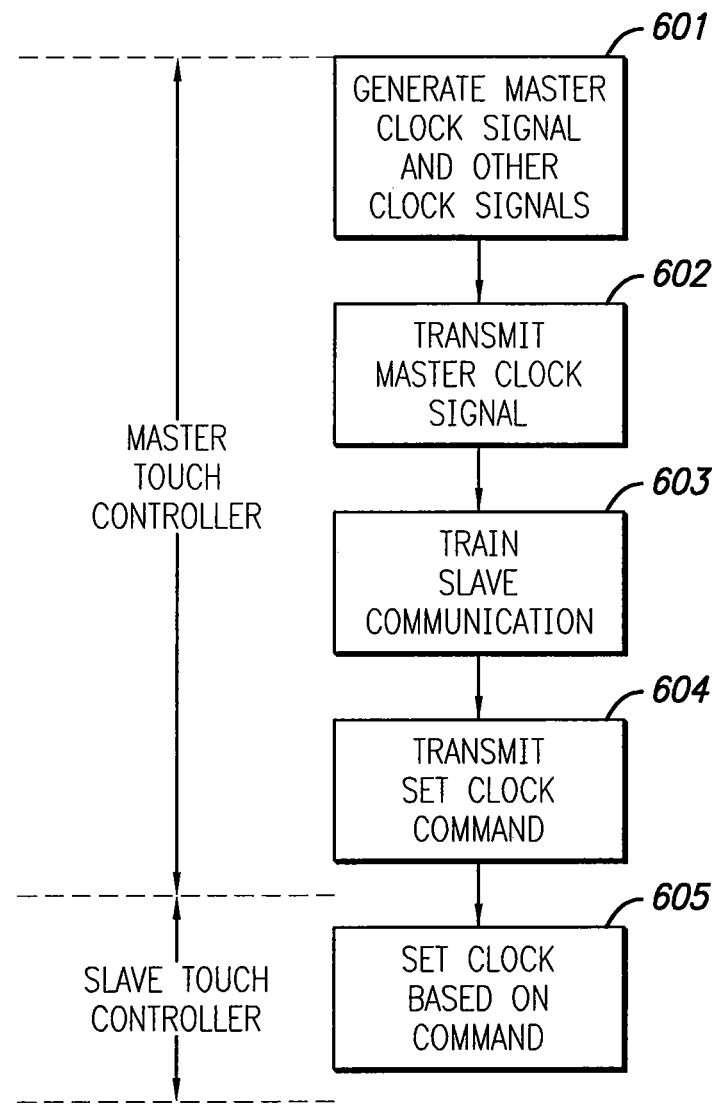
FIG. 6 illustrates an example method of synchronizing master and slave touch controllers according to various embodiments.

Referring to FIGS. 5-6, master touch controller 501 includes a clock (not shown) that generates (601) a master clock signal 515 at 48 MHz. Other clock signals, such as 12 MHz, 8 MHz, and 4 MHz clock signals (not shown), for example, can also be generated in master touch controller 501. The clock signals generated by the master touch controller can correspond to clock signals 333, 337, 313, and 341 shown in FIG. 4, for example. In an initialization process, which may occur when the system first starts, after an error is detected in a previous communication, etc., master touch controller 501 transmits (602) master clock signal 515 over clock line 511 to slave touch controller 503. In some embodiments, the master touch controller can precede the transmission of master clock signal 515 with a reset signal, for example, which can cause the slave touch controller to revert to an initial state in which certain operations of the slave are stopped and the slave is monitoring serial link 505. As a result of transmission of the master's 48 MHz clock signal to the slave, the 48 MHz clock signal generated by the master touch controller can be essentially the same 48 MHz clock signal used by the slave touch controller. Therefore, after accounting for shifts in the phase of clock signal 515 due to, for example, transmission delays, processing delays, etc., if any, as described below, the 48 MHz clock signals of the master and slave touch controllers can be in-phase.

Master touch controller 501 can train (603) slave touch controller 503 to establish a communication sequence across data line 513 of serial link 505. For example, master touch controller 501 can transmit a command, for example a sync link character, over data line 513 to initiate a communication sequence with slave touch controller 503. In one example communication sequence, a bi-directional communication over data line 513 can be established, in which the master can transmit over the data line during the first half of a time period, and the slave can transmit over the data line during a second half of the time period. For example, a twenty-four clock cycle period (numbered, e.g., clock cycles 0-23) can be shared between the master and the slave, such that the master controls a first portion of the communication sequence, e.g., the first twelve clock cycles (i.e., clock cycles 0-11), as a master transmit period, and the slave controls a second portion, e.g., the second twelve clock cycles (i.e., clock cycles 12-23), as a slave transmit period. Some of the sequence information may be predetermined, such as, for example, the number of clock cycles in each master/slave transmit period and the portions of each communication sequence used for master and slave transmit periods. In some embodiments, for example, the sync link character can be a command that simply indicates a beginning clock cycle of the communication sequence, which can indicate to the slave when to begin counting the 48 MHz clock cycles at a clock cycle 0, and a memory of the slave may include data that can be pre-stored locally in the slave, of the length of the communication sequence (e.g., 0-23 clock cycles), the clock cycles that are for master transmission, and the clock cycles that are for slave transmission. The slave controller can read the pre-stored data from the local memory to be used in conjunction with the sequence information transmitted by the master.

For example, the sync link character can train the slave to know which 48 MHz clock cycle is a first clock cycle (e.g., clock cycle 0) of the master/slave communication sequence, which 48 MHz clock cycle is a last clock cycle (e.g., clock cycle 23), which portions of the communication sequence are controlled by the master and slave. Control of communication over data line 513 can continue to alternate between the master and slave. After communication has been established between the master and the slave, the slave's lower-frequency clocks, such as 12 MHz, 8 MHz, and 4 MHz clocks, for example, can be set to be in-phase with the lower-frequency clocks of the master, such that touch sensing operations can be performed in-phase by the master and the slave, as described below.

Figure 7:
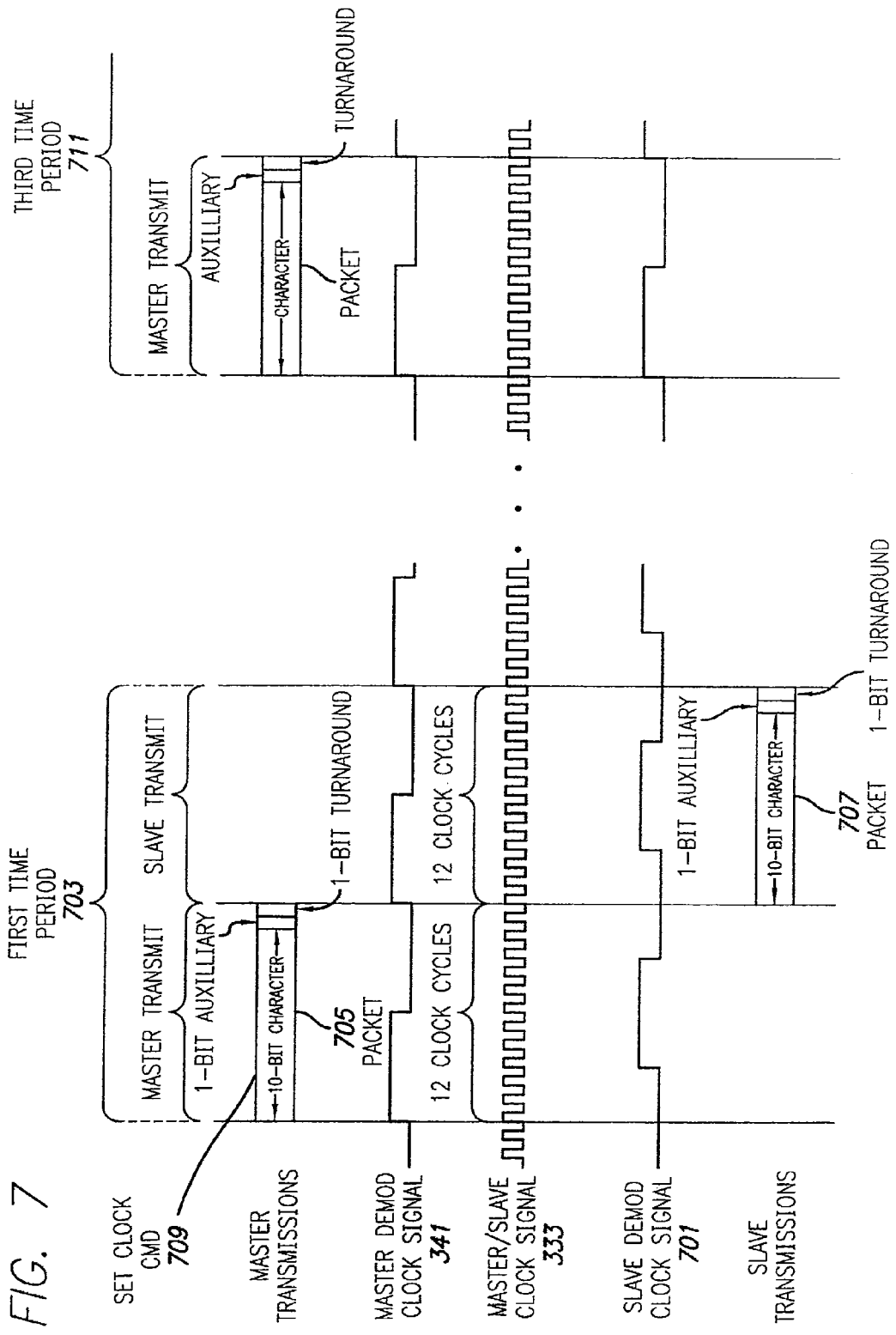
FIG. 7 illustrates an example synchronization communication according to various embodiments.

FIG. 7 illustrates an example clock signal setting process according to embodiments of the disclosure. FIG. 7 shows master transmissions and slave transmissions over data line 513 after training 603 of FIG. 6 has established serial communication between the master and slave touch controllers. FIG. 7 shows the master/slave 48 MHz clock signal, i.e., clock signal 333, master 4 MHz clock signal 341, and a slave 4 MHz clock signal 701. During the first twelve of the 48 MHz clock cycles of a first time period 703, master touch controller controls transmission over data line 513, and slave touch controller controls transmission during the second twelve clock cycles of the first time period. First time period 703 can be, for example, a time period immediately following the establishment of communication between the master and slave by training 603 of FIG. 6, or first time period 703 can be a subsequent time period. Using twelve clock cycles for each master/slave transmission can make sense in this example because the high frequency clock signal, 48 MHz, and the low frequency clock signal, 4 MHz, differ by a factor of twelve, which may allow internal processes to be run conveniently at 4 MHz.

The master and slave touch controllers can transmit packetized data, such as packets 705 and 707, over data line 513. Each packet can be, for example, a 12-bit packet that includes a 10-bit character, one bit for an auxiliary, and one bit for turnaround. The 10-bit character can be, for example, 8 b/10 b encoded data.

As described above, because the master touch controller transmits the 48 MHz clock signal to the slave, the 48 MHz clock signals (the high frequency clock signals) of the master and slave touch controllers are the same clock signal (shown as one clock signal 333 in FIG. 7) and are therefore in-phase. The serial communication protocol can be established based on clock signal 333. In some embodiments, the slave touch controller can generate other clock signals based on the high frequency clock signal received from the master. Initially, the other clock signals in the slave may not be in-phase with the corresponding clock signals in the master. In this example embodiment, during first time period 703, the low frequency clock signals, i.e., the 4 MHz clock signals 341 and 701 of the master and slave, respectively, are not in-phase. In this example, clock signal 341 goes from low to high at the first 48 MHz clock cycle of first time period 703, and clock signal 701 goes from low to high at the fourth 48 MHz clock cycle.

Referring to FIG. 6, after serial communication between the master and slave touch controllers is established by training (603), for example, the master can send 8 b/10 b control characters, and the slave can receive and reply to the master. For example, the master touch controller can transmit (604) a set clock command to the slave touch controller. The set clock command can allow the slave to set one or more other clock signals to be in-phase with corresponding clock signals in the master. The slave touch controller can receive the set clock command and set (605) one or more of its clock signals based on phase alignment information in the set clock command. The phase alignment information can indicate the time at which the one or more clock signals of the master touch controller will go from a low state to a high state, for example. FIG. 7 illustrates an example clock setting procedure in which the master touch controller can transmit a set clock command 709 as a 10-bit control character of packet 705 during first time period 703. Set clock command 709 can instruct the slave touch controller, for example, to set its lower frequency clock signals to go from low to high at the first 48 MHz clock cycle of a subsequent time period, for example, two time periods after the time period in which the slave received the set clock command. FIG. 7 shows that the slave touch controller can receive set clock command 709 transmitted in first time period 703, and the slave can set clock signal 701 to go from low to high at the first 48 MHz clock cycle of a third time period 711, which is two time periods after the first time period.

In this example embodiment, the slave and master clock signals are in-phase when the slave's lower frequency clock signals are set to go from low to high at the first 48 MHz clock cycle of the time period. In some embodiments, the slave and master clock signals may be in-phase at a different one of the 48 MHz clock cycles because of, for example, delays in the system, such as communication delays, panel delays, etc. For example, in some embodiments, the configuration of the drive and sense lines of the touch sensing surface can cause the sense signals received by the master to be received earlier than the sense signal received by the slave. In this case, the delay in the reception of the slave's sense signals can require a corresponding delay in the slave's lower frequency clock signals. Thus, in some embodiments, the set clock command may cause the slave to set the lower frequency clock signals to go from low to high at the third 48 MHz clock cycle, for example. In other words, the lower frequency clock signals of the slave can be based on the 48 MHz clock signal and phase alignment information, such as a known difference in delays in the touch sensing system by, for example, three 48 MHz clock cycles. The slave clock signals can be generated in a known phase relationship with the master clock signals so that the clock signals of the master and slave are in-phase with respect to the touch sensing operations performed in the master and slave.

In some embodiments, the slave touch controller may not generate other clocks until receiving a set clock command from the master. In this case, after the slave receives the command from the master, the slave may simply begin generating one or more other clock signals at the appropriate time such that they are in-phase with the master's clock signals.

As mentioned above, once the clock signals of the master and slave touch controllers are in-phase, touch sensing operations such as described above with reference to FIGS. 1-4 can be performed under the control of the master touch controller using the serial link, for example, to communicate commands to the slave, to program the slave, to receive data from the slave, etc. Serial interfaces, such as serial interfaces 113 and 173, of the master and slave touch controllers can provide functionality for communication via the serial link.

Figure 8:
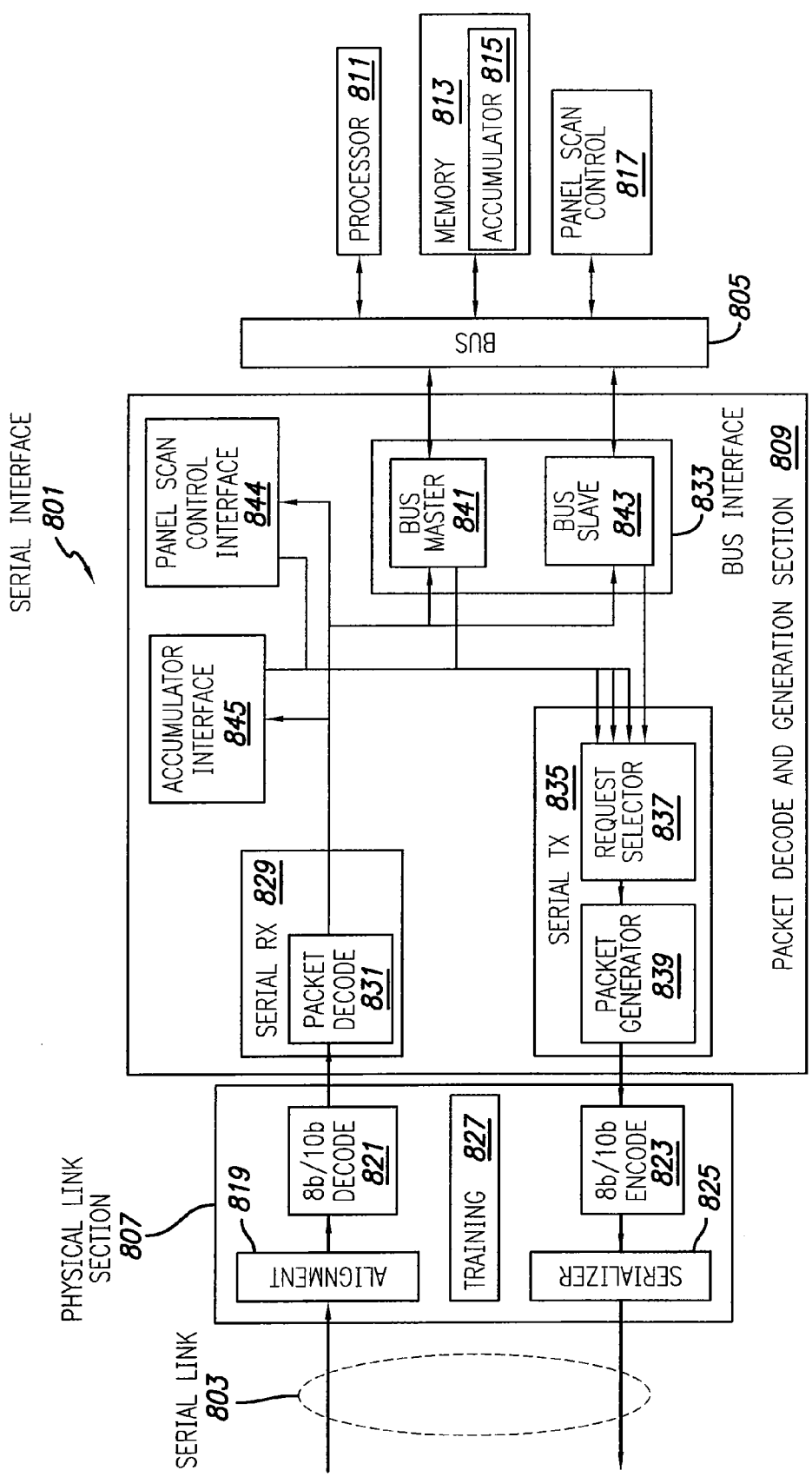
FIG. 8 illustrates an example serial interface according to various embodiments.

FIG. 8 illustrates an example serial interface 801 that can provide an interface between a serial link 803 and components of a touch controller that can be connected through a bus 805, such as an AHB, according to embodiments of the disclosure. Serial interface 801 may be implemented, for example, as serial interface 113 and/or serial interface 173 of FIG. 1. Serial interface 801 can include a physical link section 807 that can provide a low-level interface to serial link 803, and a packet decode and generation section 809 that can provide a higher-level interface to various components of the touch controller and other system components that are connected to bus 805, such as a processor 811, a memory 813 including an accumulator 815, and a panel scan control 817.

Transmissions over serial link 803 can be, for example, data packets encoded under 8 b/10 b protocol. Physical link section 807 can include an alignment module 819 that can receive and perform byte alignment of data packets, and an 8 b/10 b decode 821 that can convert the encoded packets into 8-bit data, provide error checking, and send the data to packet decode and generation section 809 for further processing. Physical link section 807 can also include 8 b/10 b encode 823 that can convert outgoing 8-bit packets into 10-bit packets and send them to a serializer 825 that can serialize the packets and transmit them across serial link 803. Physical link section 807 can also include a training module 827 that can perform a training operation, such as training (603) of FIG. 6, to establish serial communication with other touch controllers across a data line of serial link 803.

Packet decode and generation section 809 can include a serial receive (RX) section 829 that can include a packet decode 831 that decodes 8-bit packet data from 8 b/10 b decode 821 and determines, for example, a destination of the packet. Serial RX section 829 can send the packet to its destination within packet decode and generation section 809 or can forward the packet to a bus interface 833 for transmission on bus 805 if the destination is outside of the packet decode and generation section. A serial transmit (TX) section 835 can include a request selector 837 that prioritizes requests to be sent out over serial link 803. For example, request selector 837 can be a scheduler, such as a round robin scheduler. Serial TX section 835 can also include a packet generator 839 that can packetize data to be sent out over serial link 803.

Bus interface 833 can include a bus master interface 841 and a bus slave interface 843 that can allow serial interface 801 to communicate with other components of the touch controller via bus 805. Bus master interface 841 can communicate with the other components of serial interface 801, for example, to forward read/write register requests, etc. Bus slave interface 843 can allow other components with a bus master interface on bus 805 to communicate with serial interface 801.

Through bus interface 833, serial interface 801 can provide an interface for touch controller components connected to bus 805 to communicate with the components of other touch controllers through the other touch controllers' serial interfaces. Various example communications are described below in terms of communications between components of a master touch controller and components of a slave touch controller. While the example communications will be described using only the single illustrated example serial interface 801 of FIG. 8, it should be understood that each of the master and slave touch controllers include a serial interface such as serial interface 801 and that, with the exceptions of "bus master interface" and "bus slave interface", reference to a "master" or "slave" for a specific location of a component refers to a master touch controller and a slave touch controller, respectively.

In one example communication, processor 811 of the master can write into a memory register of the slave. The master's processor can transmit a request to the bus that would be picked up by the master's bus slave interface, which would encode the request as a series of 12-bit transmissions and would send the transmissions across serial link 803 to the slave, where it is decoded. After decoding on the slave, the request would be forwarded to the slave's bus master interface, which would take the request and transmit it on the slave's bus to accomplish the requested write into the slave's memory.

Serial interface 801 can also include specialized interfaces that can provide support for specific type of communications. For example, a panel scan control interface 844 can provide a specialized interface for panel scan control 817. Panel scan control 817 can be the primary control for stimulation, demodulation, and other signal processing for touch sensing. Therefore, synchronous operation of the master and slave panel scan controls can be desirable. The master's panel scan control can transmit control characters, through the master's panel scan control interface 844, across serial link 803 to control the operation of the slave's panel scan control and to coordinate the slave's operations with the master's operations. In some cases, panel scan control interface 844 can transmit special control characters. For example, when panel scan control needs to send an urgent data, panel scan control interface can include a back-to-back transmission command with the data.

Figure 9:
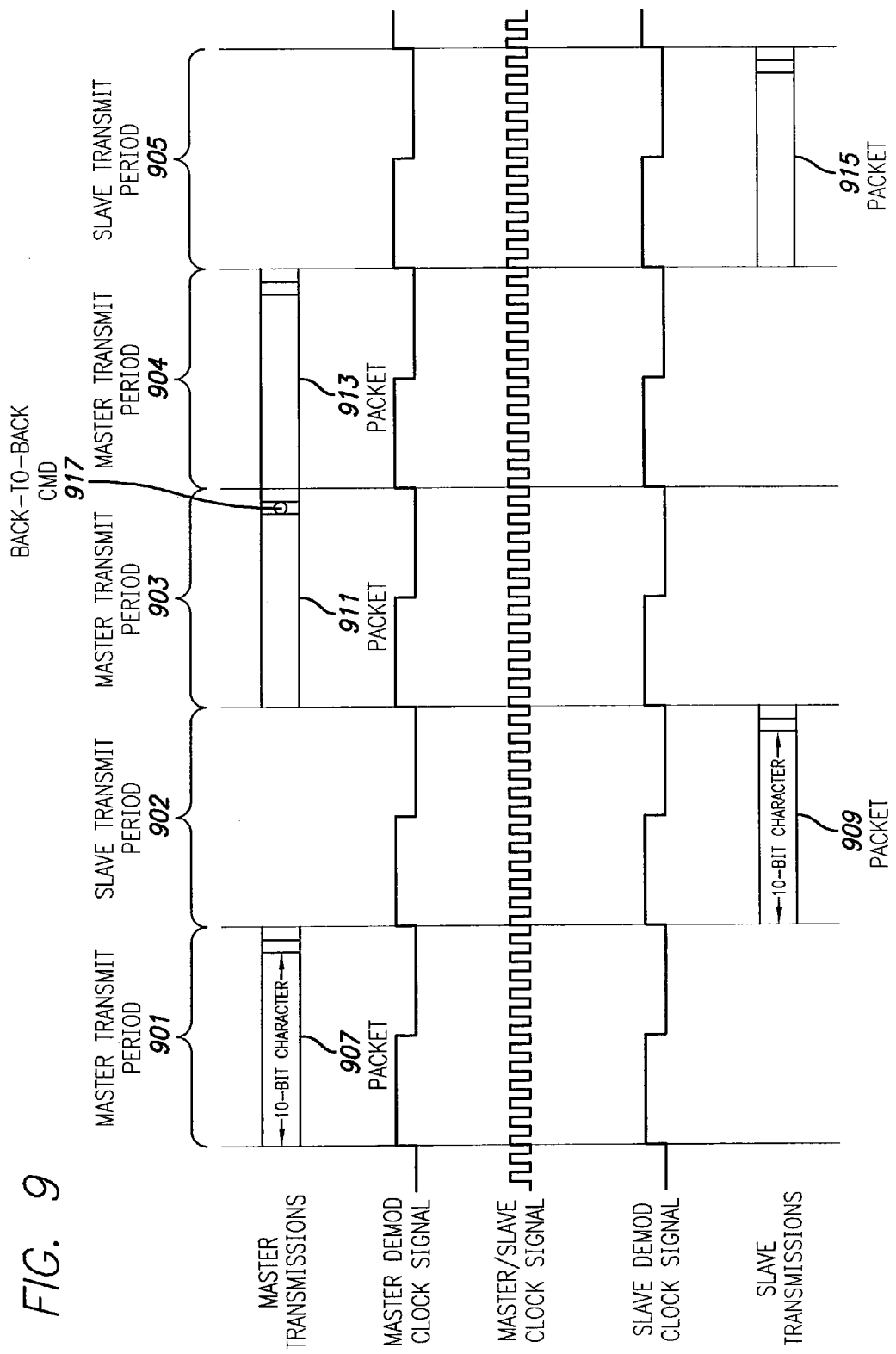
FIG. 9 illustrates an example back-to-back transmission according to various embodiments.

FIG. 9 illustrates an example series of transmissions 901-905, including a back-to-back transmission of the master. Master transmit period 901 and slave transmit period 902 represent normal transmit periods during which the master transmits a packet 907 and the slave transmits a packet 909, respectively. During master transmit period 903, the master transmits packet 911, which includes a back-to-back transmission command 917. Back-to-back transmission command 917 can be, for example, a 1-bit character that can be transmitted in the auxiliary bit of a packet transmitted to the slave during a master transmit period to instruct the slave not to transmit during the next slave transmit period because the master will be transmitting. In other words, the master will transmit in two consecutive transmit periods by "hijacking" one of the slave's transmit periods. A back-to-back transmission can be particularly useful when a touch controller has time-critical information to communicate, and when the amount of information is not excessively large. For example, a control packet communicated by the panel scan control can be only two bytes long, with the first byte in the packet being an indication of the start of a control packet and the second byte in the packet being the actual control packet, for example. In this case a single back-to-back transmission would be enough to transmit the entire packet, and the bandwidth of the serial link that is usurped by the back-to-back transmission can be acceptable. When the slave decodes the packet and recognizes the back-to-back transmission command, the slave does not transmit during the next slave transmit period, rather, the slave listens for a transmission from the master. Thus, FIG. 9 shows the next transmit period as master transmit period 904, during which the master transmits a packet 913. In the next transmit period, slave transmit period 905, the slave can transmit a packet 915, and normal communication sequence can resume with alternating master/slave transmit periods. It should be noted that a slave may use a back-to-back transmission in some circumstances, i.e., back-to-back transmission is not limited to a master transmissions.

Referring to FIG. 8, more details of an example panel scan control transmission will now be described. Panel scan control 817 can send a request to serial interface 801 to indicate that the panel scan control has a control packet to send across serial link 803. A handshake between serial interface 801 and panel scan control 817 can be performed such that the panel scan control can be informed by serial interface 801 of when a request is sent. In this way, panel scan control 817 can know when to expect the slave to act on the request, for example, because the system can have a known, fixed latency for the time it takes for the slave to act on a request. The actions of the master and slave can, for example, be coordinated based on known latencies and known transmission times of the commands. Therefore, various touch sensing processes, such as the processes described above with reference to FIGS. 1-4 may be performed with a master/slave configuration of touch controllers according to embodiments of the disclosure.

Figure 10:
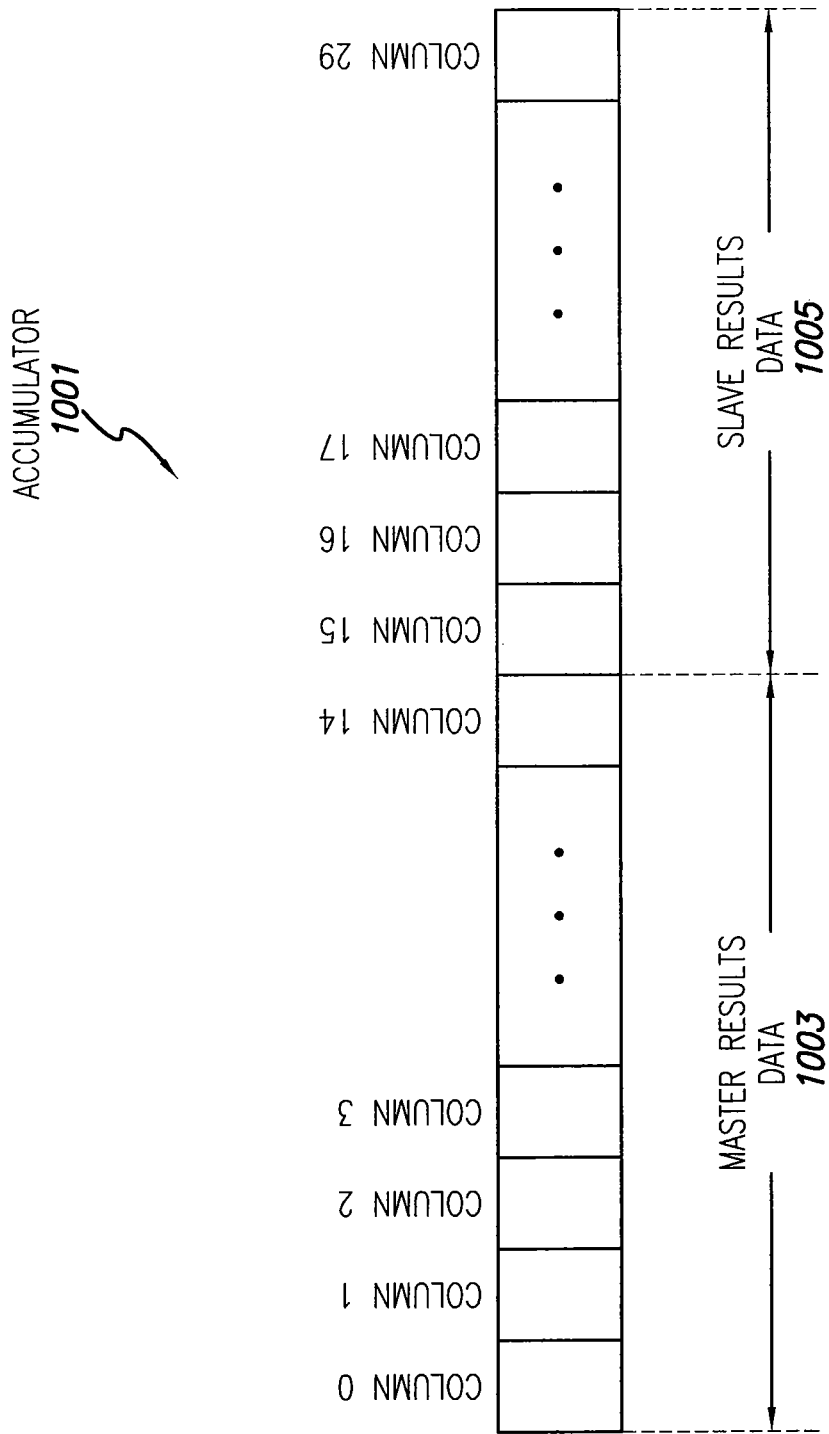
FIG. 10 illustrates an example accumulator according to various embodiments.

As described above, during a touch sensing scan of the touch sensing surface, touch information is collected by each of the sense channels of the master and slave touch controllers. The touch information of each sense channel can be accumulated in an accumulator, such as accumulator 815. FIG. 10 illustrates an example accumulator 1001 in a master touch controller. Accumulator 1001 can include thirty columns, for example, corresponding to thirty sense lines of the touch sensing surface, e.g., touch screen 201 shown in FIG. 2, including fifteen columns for master results data 1003 collected by the master's sense channels and fifteen columns for slave results data 1005 collected by the slave's sense channels. At the end of a scan of the touch sensing surface, i.e., when touch information from all sense lines has been collected by the corresponding sense channels of the master and slave touch controllers, master results data 1003 is stored in columns 0 through 14 of accumulator 1001, but columns 15 through 29 are empty because slave results data is stored in a corresponding accumulator in the slave. Thus, touch information can be generated by and stored in the master and slave touch controllers. In some embodiments, results data such as the touch information that is stored in the master touch controller can be processed in the master to obtain output data, such as touch location, velocity, proximity, etc., and likewise, results data stored in the slave touch controller can be processed in slave. However, in some embodiments, results data stored in the master and one or more slaves can be processed in a single touch controller. For example, results data stored in the slave touch controller can be transmitted to the master touch controller and consolidated with the master's results data for processing. In this regard, once the accumulator of the slave has accumulated a predetermined amount of data (columns), the slave's accumulator can send a request to transmit the slave results data to the master.

For example, the slave's accumulator can communicate with the slave's accumulator interface 845 through the slave's bus 805 to indicate to the accumulator interface that data is available for transfer (e.g., the scan is completed). The accumulator interface can generate a request to the slave's serial TX section 835, which can generate a results packet and can send the results packet across the serial link. The results packet can be decoded by the master's packet decoder 831 and can be written by the master's accumulator interface 845 through the master's bus slave interface into the accumulator of the master touch controller.

Figure 11:
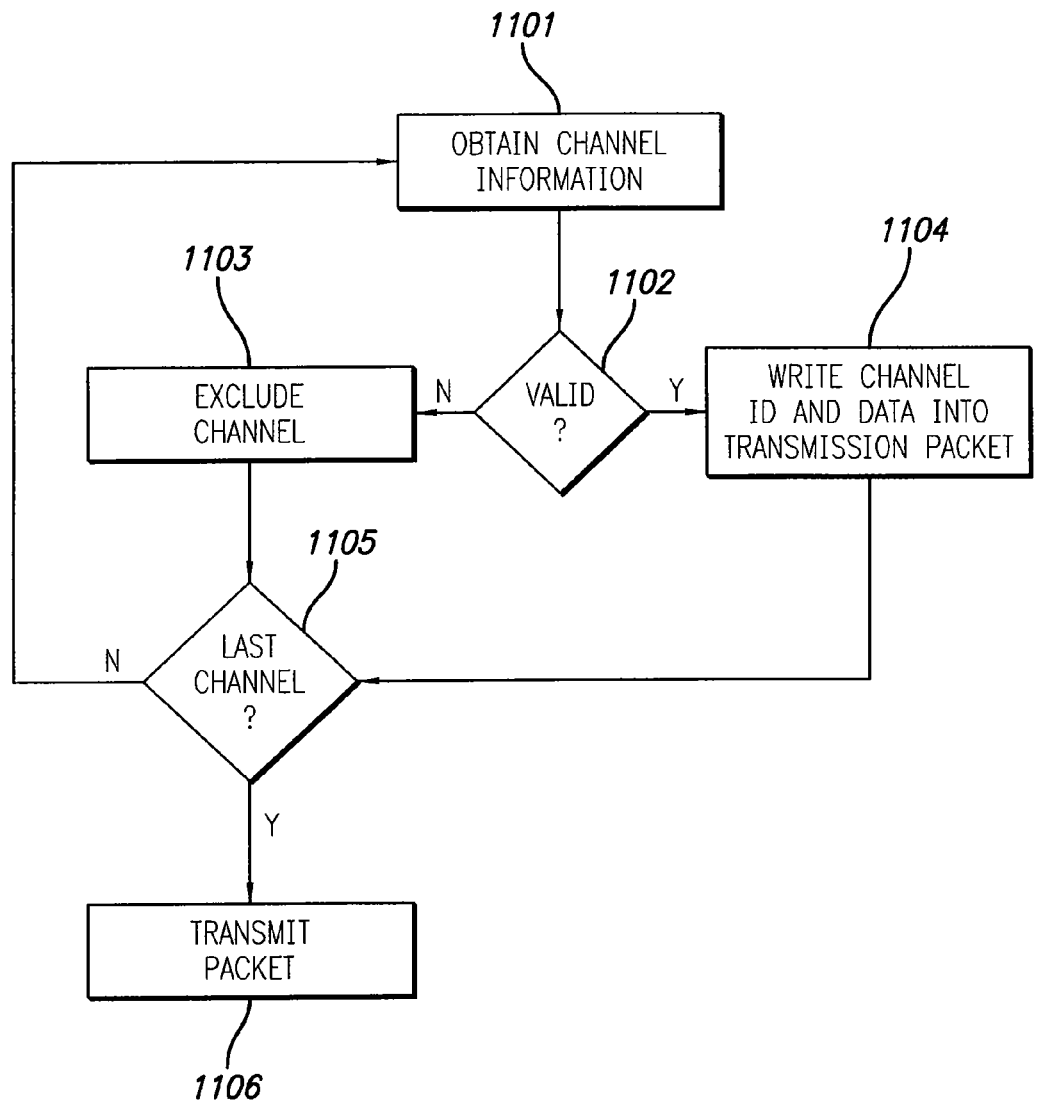
FIG. 11 illustrates an example method of transferring results data of valid channels according to various embodiments.

As described above, the time allowed for processing touch information of each scan might be limited. FIG. 11 illustrates an example results data transfer process that includes determining the validity of a sense channel and excluding invalid channels from the results data transfer according to embodiments of the disclosure. When the slave touch controller is ready to transfer results data to the master, the slave's accumulator interface can obtain (1101) information from a channel and determine (1102) whether the channel is valid. For example, the channel information may be noise information that is determined by a spectrum analyzer function performed by the panel scan control of the slave touch controller. If the channel is determined to be too noisy, the slave's accumulator interface may determine that the channel is not valid and the channel can be excluded (1103) from transmission to the master. On the other hand, if the channel is determined to be valid, the accumulator interface can write (1104) the channel's data into a transmission packet. The channel's identification can also be written into the packet. For example, the identification of one or more valid channels can be written into the packet's header, such that the header information identifies the valid channel data that is included in the packet. The process can then determine (1105) whether the channel is the last channel. If the channel is the last channel, the results packet can be transmitted (1106) to the master touch controller. Otherwise, the accumulator interface can obtain (1101) information of the next channel and the process can be repeated.

In some embodiments, the determination of whether a channel is valid or invalid can be made dynamically, i.e., in real-time during the operation of touch sensing. For example, a determination of the level of noise of each channel can be made for each scan, and therefore, the determination of the validity of a channel can vary with each scan. In other embodiments, the validity of a channel can be predetermined. For example, not all of a slave's (or master's) sense channels may be used; that is, some of the sense channels may be inactive. For example, FIG. 2 illustrates one example configuration in which a touch screen 201 includes thirty sense lines, and each of the two touch controller includes fifteen sense channels; thus, all of the sense channels of the master and slave are used, i.e., all of channels are valid. However, in another example embodiment, a touch screen can include twenty-five sense lines, for example, and fifteen sense lines can be connected to the master's fifteen sense channels, while the remaining ten sense lines can be connected to ten of the slave's sense channels. In this example, five of the slave's sense channels can be predetermined to be invalid.

In some embodiments in which channel validity is determined dynamically, the determination can be based on noise, such that the result data of noisy channels can be determined to be invalid and, thus, is not transferred to the master. In some embodiments, the determination can be based on detected interference of the sense channel, for example, interference between the sense channel and other circuitry near the sense channel, such as display circuitry that displays an image on a display screen. In other embodiments, the slave's accumulator interface may determine whether the results data of a channel is indicative of a touch or no touch. If the results data indicates no touch, then the accumulator interface may determine the channel to be invalid and exclude the channel's results data from transfer to the master. In other words, only results data indicative of a touch may be transferred. In other embodiments, some channels may be specialized to indicate only a touch/no touch of, for example, a specific location on the touch screen.

Note that one or more of the functions described above can be performed by software and/or firmware stored in memory and executed by one or more processors. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Some of the potential advantages of various embodiments of the disclosure, such as thinness and/or reduced size, may be particularly useful for portable devices, though use of embodiments of the disclosure is not limited to portable devices. FIGS. 12A-12C show example systems in which master/slave processing may be implemented in a touch screen according to embodiments of the disclosure. FIG. 12A illustrates an example mobile telephone 1236 with a touch screen 1224 that can include master/slave touch sensing processing according to various embodiments. FIG. 12B illustrates an example digital media player 1240 with a touch screen 1226 that can include master/slave touch sensing processing according to various embodiments. FIG. 12C illustrates an example personal computer 1244 with a touch screen 1228 and a trackpad 1230 that can each include master/slave touch sensing processing according to various embodiments.

Although the disclosed embodiments have been fully described with reference to the accompanying drawings, it is to be noted that various changes and modifications will become apparent to those skilled in the art. For example, although generating/transmitting drive signals and processing sense signals in the foregoing example embodiments can include operations such as generation/transmission based on an 8 MHz clock signal, analog-to-digital conversion based on a 48 MHz clock signal, decimation based on a 12 MHz clock signal, and demodulation based on a 4 MHz clock signal, some embodiments can generate/transmit drive signals and can process sense signals using other operations and/or based on clock signals of other frequencies, some or all of which may be phase-aligned according to methods described above. Such changes and modifications are to be understood as being included within the scope of the disclosed embodiments as defined by the appended claims.

What is claimed is:

1. A method of centralized processing of touch information from a plurality of touch sensing controllers, each touch sensing controller including a plurality of sense channels each for receiving a sense signal from a corresponding sense line of a touch sensing surface, the method comprising:
   obtaining touch information from one or more sense channels receiving the sense signals in at least one of the touch sensing controllers, wherein the touch information includes information of an amount of touch at one or more locations on the touch sensing surface;
   storing the touch information from the one or more sense channels in a corresponding memory of at least one of the touch sensing controllers;
   determining a validity of each of the plurality of sense channels of the at least one touch sensing controller;
   transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission; and
   processing the transmitted touch information by the processor,
   wherein determining the validity includes determining whether or not a sense channel received a sense signal, wherein a sense channel that received a sense signal is a valid sense channel, and a sense channel that did not receive a sense signal is an invalid sense channel.

2. The method of claim 1, wherein the processor is located in one of the other touch sensing controllers.

3. The method of claim 1, wherein transmitting the touch information includes transmitting an identity of one or more valid sense channels.

4. A method of centralized processing of touch information from a plurality of touch sensing controllers, each touch sensing controller including a plurality of sense channels each for receiving a sense signal from a corresponding sense line of a touch sensing surface, the method comprising:
   obtaining touch information from one or more sense channels receiving the sense signals in at least one of the touch sensing controllers, wherein the touch information includes information of an amount of touch at one or more locations on the touch sensing surface;
   storing the touch information from the one or more sense channels in a corresponding memory of at least one of the touch sensing controllers;
   determining a validity of each of the plurality of sense channels of the at least one touch sensing controller;
   transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission; and
   processing the transmitted touch information by the processor,
   wherein determining whether or not a sense channel received a sense signal includes identifying one or more sense channels that are unused for receiving sense signals from the touch sensing surface, wherein each identified unused sense channel is predetermined to be an invalid sense channel.

5. A method of centralized processing of touch information from a plurality of touch sensing controllers, each touch sensing controller including a plurality of sense channels each for receiving a sense signal from a corresponding sense line of a touch sensing surface, the method comprising:
   obtaining touch information from one or more sense channels receiving the sense signals in at least one of the touch sensing controllers, wherein the touch information includes information of an amount of touch at one or more locations on the touch sensing surface;
   storing the touch information from the one or more sense channels in a corresponding memory of at least one of the touch sensing controllers;
   determining a validity of each of the plurality of sense channels of the at least one touch sensing controller;
   transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission;
   processing the transmitted touch information by the processor;
   determining a value of a parameter associated with each of the one or more sense channels; and
   determining the validity of each sense channel is based on the value of the parameter,
   wherein the parameter is based on one of an amount of noise, an amount of interference, or a determination of whether touch information obtained from the sense channel includes information of a touch on or near the touch sensing surface.

6. The method of claim 5, wherein the parameter is associated with each of two or more redundant sense channels, and determining the validity includes selecting one of the redundant sense channels as a valid sense channel and the other one or more redundant sense channels as invalid sense channels based on the relative values of the parameter.

7. A touch sensing system comprising:
   a touch sensing surface; and
   a plurality of touch sensing controllers, each touch sensing controller including a plurality of sense channels each for receiving and processing a sense signal from a corresponding sense line of the touch sensing surface to obtain touch information, and a memory that stores the touch information from each of one or more of the sense channels, wherein one or more of the touch sensing controllers further includes
   a module that identifies a validity of each of the plurality of sense channels of the touch sensing controller, and
   a transmitter that transmits a transmission to a processor external to the touch sensing controller, the transmission including the touch information from at least one valid sense channel and excluding the touch information from at least one invalid sense channel based on the identified validities of the sense channels,
wherein the processor processes the touch information of the plurality of touch sensing controllers, wherein the module identifies whether or not a sense channel received a sense signal, wherein a sense channel that received a sense signal is identified as a valid sense channel, and a sense channel that did not receive a sense signal is identified as an invalid sense channel.

8. The touch sensing system of claim 7, wherein the processor is located in one of the other touch sensing controllers.

9. A touch sensing system comprising:
a touch sensing surface; and
a plurality of touch sensing controllers, each touch sensing controller including a plurality of sense channels each for receiving and processing a sense signal from a corresponding sense line of the touch sensing surface to obtain touch information, and a memory that stores the touch information from each of one or more of the sense channels, wherein one or more of the touch sensing controllers further includes
   a module that identifies a validity of each of the plurality of sense channels of the touch sensing controller, and
   a transmitter that transmits a transmission to a processor external to the touch sensing controller, the transmission including the touch information from at least one valid sense channel and excluding the touch information from at least one invalid sense channel based on the identified validities of the sense channels,
wherein the processor processes the touch information of the plurality of touch sensing controllers, and
wherein a sense channel that is unused for receiving sense signals is predetermined to be the sense channel that did not receive a sense signal, and the module identifies the unused sense channel as an invalid sense channel by controlling the transmitter to exclude the unused sense channel.

10. A touch sensing system comprising:
a touch sensing surface; and
a plurality of touch sensing controllers, each touch sensing controller including a plurality of sense channels each for receiving and processing a sense signal from a corresponding sense line of the touch sensing surface to obtain touch information, and a memory that stores the touch information from each of one or more of the sense channels, wherein one or more of the touch sensing controllers further includes
   a module that identifies a validity of each of the plurality of sense channels of the touch sensing controller, and
   a transmitter that transmits a transmission to a processor external to the touch sensing controller, the transmission including the touch information from at least one valid sense channel and excluding the touch information from at least one invalid sense channel based on the identified validities of the sense channels,
wherein the processor processes the touch information of the plurality of touch sensing controllers, and
wherein the module determines value of a parameter associated with each of the one or more sense channels and identifies the validity of each sense channel based on the value of the parameter, wherein the parameter is based on one of an amount of noise, an amount of interference, or a determination of whether touch information obtained from the sense channel includes information of a touch on or near the touch sensing surface.

11. The touch sensing system of claim 10, wherein the parameter is associated with each of two or more redundant sense channels, and the module selects one of the redundant sense channels as a valid sense channel and the other one or more redundant sense channels as invalid sense channels based on the relative values of the parameter.

12. A non-transitory computer-readable storage medium storing computer-executable instructions executable to perform a method of transmitting touch information from a plurality of touch sensing controllers to an external processor, the touch sensing controllers each including a plurality of sense channels each for receiving a sense signal from a corresponding sense line of a touch sensing surface, the method comprising:
   obtaining touch information from one or more sense channels receiving the sense signals in at least one of the touch sensing controllers, wherein the touch information includes information of an amount of touch at one or more locations on the touch sensing surface;
   storing the touch information from the one or more sense channels in a corresponding memory of the at least one of the touch sensing controllers;
   determining a validity of each of the plurality of sense channels of the at least one touch sensing controller; and
   transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission,
wherein determining the validity includes determining whether or not a sense channel received a sense signal, wherein a sense channel that received a sense signal is a valid sense channel, and a sense channel that did not receive a sense signal is an invalid sense channel.

13. The non-transitory computer-readable storage medium of claim 12, wherein transmitting the touch information includes transmitting an identity of one or more valid sense channels.

14. A non-transitory computer-readable storage medium storing computer-executable instructions executable to perform a method of transmitting touch information from a plurality of touch sensing controllers to an external processor, the touch sensing controllers each including a plurality of sense channels each for receiving a sense signal from a corresponding sense line of a touch sensing surface, the method comprising:
   obtaining touch information from one or more sense channels receiving the sense signals in at least one of the touch sensing controllers, wherein the touch information includes information of an amount of touch at one or more locations on the touch sensing surface;
   storing the touch information from the one or more sense channels in a corresponding memory of the at least one of the touch sensing controllers;
   determining a validity of each of the plurality of sense channels of the at least one touch sensing controller; and transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission, wherein determining whether or not a sense channel received a sense signal includes identifying one or more sense channels that are unused for receiving sense signals from the touch sensing surface, wherein each identified unused sense channel is predetermined to be an invalid sense channel.

15. A non-transitory computer-readable storage medium storing computer-executable instructions executable to perform a method of transmitting touch information from a plurality of touch sensing controllers to an external processor, the touch sensing controllers each including a plurality of sense channels each for receiving a sense signal from a corresponding sense line of a touch sensing surface, the method comprising:

obtaining touch information from one or more sense channels receiving the sense signals in at least one of the touch sensing controllers, wherein the touch information includes information of an amount of touch at one or more locations on the touch sensing surface;

storing the touch information from the one or more sense channels in a corresponding memory of the at least one of the touch sensing controllers;

determining a validity of each of the plurality of sense channels of the at least one touch sensing controller;

transmitting the touch information from the at least one touch sensing controller to a processor external to the at least one touch sensing controller based on a result of the validity determinations, wherein the touch information from at least one valid sense channel is transmitted while the touch information from at least one invalid sense channel is excluded from the transmission;

determining a value of a parameter associated with each of the one or more sense channels; and determining the validity of each sense channel is based on the value of the parameter, wherein the parameter is based on one of an amount of noise, an amount of interference, or a determination of whether touch information obtained from the sense channel includes information of a touch on or near the touch sensing surface.

16. The non-transitory computer-readable storage medium of claim 15, wherein determining the value of the parameter is repeated each scan of the touch sensing surface.

17. The non-transitory computer-readable storage medium of claim 15, wherein the parameter is associated with each of two or more redundant sense channels, and determining the validity includes selecting one of the redundant sense channels as a valid sense channel and the other one or more redundant sense channels as invalid sense channels based on the relative values of the parameter.

18. A mobile computing device comprising:

a touch sensing system, including a touch sensing surface, and a plurality of touch sensing controllers, each touch sensing controller including a plurality of sense channels each for receiving and processing a sense signal from a corresponding sense line of the touch sensing surface to obtain touch information, and a memory that stores the touch information from each of one or more of the sense channels, wherein one or more of the touch sensing controllers further includes a module that identifies a validity of each of the plurality of sense channels of the touch sensing controller, and a transmitter that transmits a transmission external to the touch sensing controller, the transmission including the touch information from at least one valid sense channel and excluding the touch information from at least one invalid sense channel based on the identified validities of the sense channels; and a processor that receives the transmission and processes the touch information of the plurality of touch sensing controllers, wherein determining the validity includes determining whether or not a sense channel received a sense signal, wherein a sense channel that received a sense signal is a valid sense channel, and a sense channel that did not receive a sense signal is an invalid sense channel.

19. The touch sensing system of claim 9, wherein the processor is located in one of the other touch sensing controllers.

20. The touch sensing system of claim 10, wherein the processor is located in one of the other touch sensing controllers.

* * * * *